(12) United States Patent
Cook, Jr. et al.

(10) Patent No.: US 6,449,923 B1
(45) Date of Patent: Sep. 17, 2002

(54) METHOD AND APPARATUS FOR TRIGGERING OXYGEN SCAVENGING COMPOSITION WITH PULSED LIGHT

(75) Inventors: Philip H. Cook, Jr., Greer; Melania M. Craddock, Greenville, both of SC (US); William A. Feehley, Kingsville, MD (US); Nathanael R. Miranda, Spartanburg, SC (US); Drew V. Speer, Simpsonville, SC (US); Jeffrey Thomas, White Plains, NY (US)

(73) Assignee: Cryovac, Inc., Duncan, SC (US)

(*) Notice: Subject to any disclaimer, the term of this patent is extended or adjusted under 35 U.S.C. 154(b) by 0 days.

(21) Appl. No.: 09/230,776

(22) PCT Filed: Jul. 30, 1997

(86) PCT No.: PCT/US97/13370
§ 371 (c)(1),
(2), (4) Date: Aug. 13, 1999

(87) PCT Pub. No.: WO98/05703
PCT Pub. Date: Feb. 12, 1998

Related U.S. Application Data

(63) Continuation-in-part of application No. 08/691,828, filed on Aug. 2, 1996, now abandoned.

(51) Int. Cl.$^7$ .................... B65B 29/00; C09K 15/02
(52) U.S. Cl. .............. 53/400; 53/141; 252/188.28
(58) Field of Search .................... 53/432, 433, 510, 53/512, 511, 434, 400, 141, 401; 252/188.28; 426/392, 124, 129, 133

(56) References Cited

U.S. PATENT DOCUMENTS

| | | | |
|---|---|---|---|
| 4,810,434 A | 3/1989 | Caines | |
| 4,871,559 A | 10/1989 | Dunn et al. | |
| 5,021,515 A | 6/1991 | Cochran et al. | |
| 5,034,235 A | * 7/1991 | Dunn et al. | ........... 426/238 |
| 5,089,323 A | 2/1992 | Nakae et al. | |
| 5,211,875 A | 5/1993 | Speer et al. | |
| 5,310,497 A | 5/1994 | Ve Speer et al. | |
| 5,350,622 A | 9/1994 | Speer et al. | |
| 5,378,428 A | 1/1995 | Inoue et al. | |
| 5,399,289 A | 3/1995 | Speer et al. | |
| 5,425,896 A | 6/1995 | Speer et al. | |
| 5,498,364 A | 3/1996 | Speer et al. | |

FOREIGN PATENT DOCUMENTS

| | | |
|---|---|---|
| EP | 0 355 982 | 2/1990 |
| EP | 0 451 762 | 10/1991 |
| EP | 0189808 | * 12/1992 |
| EP | 0520257 | * 12/1992 |
| JP | 5-32277 | 2/1993 |
| JP | 5-51048 | 3/1993 |
| JP | 5-51049 | 3/1993 |
| JP | 5-247276 | 9/1993 |
| WO | 96/08371 | 3/1996 |

OTHER PUBLICATIONS

"Pulsed–Light Treatment of Food and Packaging", Joseph Dunn, Thomas Ott and Wayne Clark, Food Technology, Sep. 1995, pp 95–98.

* cited by examiner

Primary Examiner—Stephen F. Gerrity
(74) Attorney, Agent, or Firm—Mark B. Quatt

(57) ABSTRACT

A method for triggering an oxygen scavenging composition for use in packaging an oxygen sensitive article includes the steps of providing an oxygen scavenging composition including an oxidizable organic compound, and exposing the composition to a source of pulsed light wherein each pulse has a duration of between 1 microsecond and 1 millisecond, a frequency of between 0.1 to 100 Hertz, and an intensity of at least 350 mW/cm$^2$ so that each pulse provides the composition with a dose of UV light of at least 0.1 J/cm$^2$ so as to provide a triggered composition. The triggered composition can be applied to an article so as to provide an oxygen scavenging package. An apparatus and packaging system are also disclosed.

13 Claims, 1 Drawing Sheet

US 6,449,923 B1

METHOD AND APPARATUS FOR TRIGGERING OXYGEN SCAVENGING COMPOSITION WITH PULSED LIGHT

CROSS REFERENCE TO RELATED APPLICATIONS

This application is a National Stage filing under 35 U.S.C. §371 of International Application No. PCT/US97/13370, which has an international filing date of Jul. 30, 1997 and which designated the United States of America, and said International Application claims the benefit of and a CIP of U.S. patent application Ser. No. 08/691,828, filed Aug. 2, 1996 (now abandoned).

BACKGROUND OF THE INVENTION

The invention relates generally to methods and systems of packaging oxygen sensitive products, and particularly to a system and method for triggering oxygen scavenging compositions for use in packaging oxygen sensitive articles.

It is well known that limiting the exposure of oxygen sensitive products to oxygen maintains and enhances the quality and shelf life of the product. For instance, by limiting the oxygen exposure of oxygen sensitive food products in the packaging system, the quality of the food product is maintained, and spoilage is reduced. In addition, such packaging also keeps the product in inventory longer, thereby reducing costs incurred from waste and having to restock.

U.S. Pat. No. 5,211,875 to Speer et al. discloses methods and compositions for scavenging oxygen. The "oxygen scavenging" materials disclosed by Speer et al. are compositions which consume, deplete or reduce the amount of oxygen from a given environment. Oxygen scavenging materials are useful in modified atmosphere packaging and barrier packaging environments. However, the triggering of oxygen scavenging materials typically requires a relatively long time period, e.g. several minutes. "Trigger" and the like herein mean that process defined in U.S. Pat. No. 5,211,875, whereby oxygen scavenging is initiated by exposing a composition, film, etc. to actinic radiation having a wavelength of less than about 750 nm at an intensity of at least about 1.6 mW/cm$^2$ or an electron beam at a dose of at least about 0.2 megarads, wherein after initiation the oxygen scavenging rate is at least about 0.05 cc oxygen per day per gram of oxidizable organic compound for at least two days after oxygen scavenging is initiated. The time consuming triggering process may adversely impact the operating speed and efficiency of the packaging system. The long exposure time associated with the triggering process may significantly heat the oxygen scavenging material and adversely impact the physical properties of the oxygen scavenging material.

It is therefore desirable to provide a method for triggering an oxygen scavenging film wherein the method uses shorter triggering steps and less overall time, whereby the method generates minimal heat; and/or which method is simple and readily incorporated into existing packaging procedures. It is also desirable to provide an apparatus for triggering an oxygen scavenging film.

SUMMARY OF THE INVENTION

In one aspect of the invention, a method for triggering an oxygen scavenging composition comprises providing an oxygen scavenging composition comprising an oxidizable organic compound; and exposing said composition to a source of pulsed light that comprises UV wavelengths wherein each pulse has a duration of between 1 microsecond and 1 millisecond, a frequency of between 0.1 and 100 Hertz, and a total intensity of at least about 350 mW/cm$^2$; wherein each pulse provides said composition with a dose of light of at least about 0.1 J/cm$^2$, so as to provide a triggered composition.

In a second aspect, an apparatus for triggering an oxygen scavenging composition comprises means for emitting pulses of light encompassing UV wavelengths and having a duration of between 1 microsecond and 1 millisecond and a total intensity of at least about 350 mW/cm$^2$ so that each pulse provides a dose of light of at least about 0.1 J/cm$^2$; and means for feeding a composition comprising an oxidizable organic compound to said means for emitting whereby said composition is exposed to pulses of said light so as to provide a triggered composition.

In a third aspect, a packaging system comprises means for emitting pulses of light encompassing UV wavelengths having a duration of between 1 microsecond and 1 millisecond and a total intensity of at least about 350 mW/cm$^2$ so that each pulse provides a dose of light of at least about 0.1 J/cm$^2$; means for feeding a composition having an oxidizable organic compound to said means for emitting whereby said composition is exposed to said pulses of said light so as to provide a triggered composition; means for feeding said triggered composition to a means for packaging; and means for applying said triggered composition to an article.

BRIEF DESCRIPTION OF THE DRAWINGS

A detailed description of preferred embodiments of the invention follows, with reference to the attached drawings, wherein.

DETAILED DESCRIPTION

Figure 1:
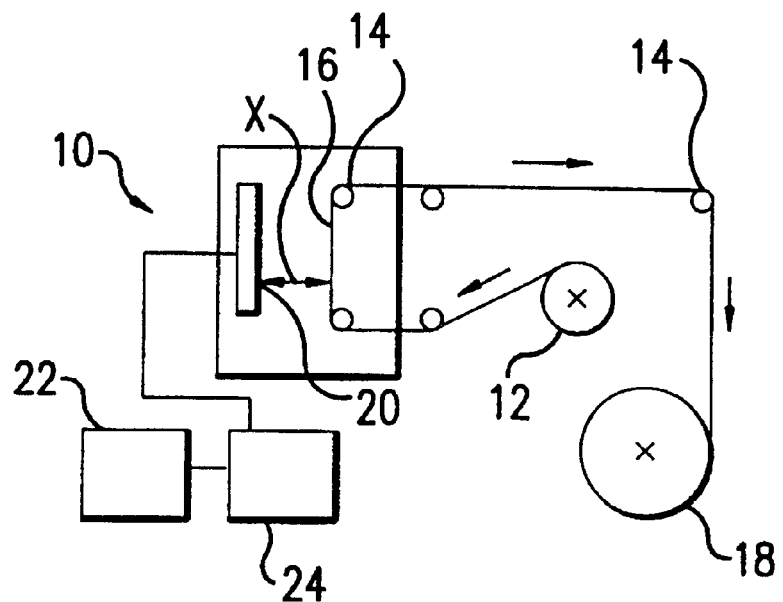
FIG. 1 schematically illustrates a stand alone apparatus and method for triggering an oxygen scavenging film.

The invention relates to a method and apparatus for triggering an oxygen scavenging film for use in packaging articles. The method and apparatus can be used in the packaging of a wide variety of oxygen sensitive products including smoked and processed meats such as sliced turkey, ham, pepperoni and bologna, vegetable products such as tomato based products, other food products, such baby foods and other products including electronic components, pharmaceuticals and the like. The apparatus is readily adaptable to various vertical form-fill-and-seal (VFFS) and horizontal form-fill-and-seal (HFFS) packaging lines.

A method and apparatus for triggering oxygen scavenging film are provided wherein the film is triggered in a relatively short treatment whereby film is rapidly triggered, and the triggering step can thereby be incorporated in-line into packaging systems without adversely impacting the operating speed of same.

Oxygen scavenging compositions generally are described in U.S. Pat. Nos. 5,211,875, 5,350,622, 5,498,364, and 5,399,289 to Speer et al., and WO 95/04776 and WO 95/02616 to Ching et al., which are all hereby incorporated by reference in their entirety. As used herein, the term oxygen scavenging film refers to a film having a composition which consumes, depletes or reduces the amount of oxygen from a given environment to which the composition is exposed. Such oxygen scavenging compositions are capable of removing oxygen from within a package and/or reducing or eliminating the ingress of oxygen into a package. The method and apparatus for triggering the oxygen scavenging film serves to trigger or activate the oxygen scavenging capability of the film as desired, while providing enhanced efficiency and/or reduced total exposure time.

Other oxygen scavengers which can be used in connection with this invention are disclosed in PCT patent publication WO 94/12590 (commonwealth scientific and industrial Research Organisation). These oxygen scavengers include at least one reducible organic compound which is reduced under predetermined conditions, the reduced form of the compound being oxidizable by molecular oxygen, wherein the reduction and/or subsequent oxidation of the organic compound occurs independent of the presence of a transition metal catalyst. The reducible organic compound is preferably a quinone, a photoreducible dye, or a carbonyl compound which has absorbence in the UV spectrum.

Compositions for use in the invention preferably include an oxidizable organic compound and a transition metal catalyst, for example as disclosed in U.S. Pat. No. 5,211,875. Oxygen scavenging compositions include, for example, oxidizable organic compounds of substituted or unsubstituted ethylenically unsaturated hydrocarbon polymers, preferably having a molecular weight of at least 1000. More preferably, the oxidizable organic compound is selected from the group consisting of styrene/butadiene copolymers, styrene/isoprene copolymers, polybutadiene, polyisoprene, and mixtures thereof, and most preferably styrene-butadiene copolymer, polybutadiene, or blends thereof The transition metal catalyst of the oxygen scavenging film is preferably a transition metal salt of cobalt, manganese, or mixtures thereof. Other suitable transition metal catalysts are disclosed in U.S. Pat. No. 5,211,875.

The ethylenically unsaturated hydrocarbon and transition metal catalyst may be further combined with one or more polymeric diluents, such as thermoplastic polymers which are typically used to form film layers in plastic packaging articles. In the manufacture of certain packaging articles well known thermosets can also be used as the polymeric diluent. Polymers which can be used as the diluent include, but are not limited to, polyethylene terephthalate (PET), polyethylene, low or very low density polyethylene, ultra-low density polyethylene, linear low density polyethylene, polypropylene, polyvinyl chloride, polystyrene, and ethylene copolymers such as ethylene-vinyl acetate, ethylene-alkyl (meth)acrylates, ethylene-(meth)acrylic acid and ethylene-(meth)acrylic acid ionomers. Blends of different diluents may also be used. The selection of the polymeric diluent largely depends on the article to be manufactured and the end use.

Exposing oxygen scavenging film to high intensity pulses of light encompassing UV wavelengths at a certain intensity and duration of pulses can provide triggering of the oxygen scavenging properties of a film in a very short period of time, e.g. in a matter of seconds. Pulsed light that encompasses UV wavelengths is used to trigger oxygen scavenging films. UV light is effectively used for triggering the film at a wavelength of between 200 nm and 400 nm.

Pulsed light is preferably provided in pulse durations of between 1 microsecond and 1 millisecond, at a total intensity at the film surface of at least about 350 mW/cm$^2$ so as to expose the film to a dose of light per pulse of at least about 0.1 J/cm$^2$, preferably 0.5 J/cm$^2$. "Total intensity" herein is that intensity measured over the wavelength range of 200 nm to 1 mm. The energy of each pulse will preferably range from 0.1 to 3.0 J/cm$^2$ in the wavelength range of 200 nm to 1 mm. Pulses will preferably be delivered to provide a dose of UV light (200 to 400 nm) of at least about 0.1 mJ/cm$^2$, preferably at least about 0.4 mJ/cm$^2$ so as to provide a triggered composition (in the form of a film or other article). Pulsing of light serves to increase the power of each pulse as compared to the relatively steady lower power values of continuous UV light. This allows effective triggering of oxygen scavenging compositions and the like over shorter exposure periods with minimal heat generation thereby making the process compatible with high speed production packaging processes. Pulsed light is described in U.S. Pat. No. 4,871,559 to Dunn et al., incorporated by reference herein in its entirety.

Oxygen scavenging films to be triggered are exposed to pulses of UV light at the desired pulse duration, frequency, and intensity sufficient to provide the film with a dose of UV light per pulse of at least about 0.1 mJ/cm$^2$, preferably 0.5 mJ/cm$^2$. The upper limit of the total dose is limited to a level which does not substantially adversely effect the integrity of the composition and article or film made therefrom, i.e. does not cause a substantial undesirable change in the composition or article being exposed, and does not cause the generation of significant excess heat.

The desired dose of pulsed light is provided to a particular composition by traversing the composition over a path having a particular length over which the composition is exposed to pulses of light. The composition may be in any form used in packaging an oxygen sensitive article, including film, inserts, coatings, bottle cap liners, gaskets, rigid and semi-rigid articles, thermoformed trays, bottles, seals or the like. At intensities and pulse durations as set forth above, oxygen scavenging compositions are usefully triggered over relatively short exposure times thereby greatly shortening the triggering process so that the triggering step or components can readily be incorporated in-line into packaging processes or systems. The use of high intensity pulsed light triggers oxygen scavenging composition such that relatively high oxygen scavenging rates result, and with very small or negligible induction periods, thereby allowing the method of the present invention to be incorporated in-line to existing packaging methods so that oxygen scavenging composition can be triggered at or shortly prior to packaging, and avoiding or ameliorating problems related to storage and inventory of triggered oxygen scavenging compositions.

Oxygen scavenging compositions in the form of film exhibit oxygen scavenging rates, depending upon the formulation and type of package to which the film is applied, of between 1 cc/m$^2$/day to 100 cc/m$^2$/day at temperatures of 4° C.

Referring now to the drawings, the method and apparatus will be described for triggering oxygen scavenging composition in the form of films, although the description herein can be applied mutatis mutandis to other oxygen scavenging forms. FIG. 1 illustrates a free standing triggering unit 10 having an unwind roll 12 for feeding film to unit 10, a series of rollers 14 defining a film path 16 through triggering unit 10, and a windup roll 18 for receiving triggered film for subsequent use. Triggering unit 10 includes one or more inert gas lamps or bulbs 20 for providing high intensity pulsed light. Lamp 20 is preferably arranged relative to path 16 to pass a film (or other form) relative to lamps 20 so as to expose the film to the desired pulsed light to provide the desired dose to trigger oxygen scavenging.

Lamp 20 is preferably powered by a DC power supply 22 connected to an energy storage capacitor 24 for storing energy from power supply 22. Capacitor 24 stores energy over relatively long periods of time, for example fractions of a second, and releases energy in rapid pulses to lamp 20 so as to produce an intense flash of the desired light containing the desired UV wavelengths from lamp 20. Energy is preferably released rapidly over relatively short periods of time, preferably between 1 microsecond and 1 millisecond in duration, typically 100 to 400 milliseconds at a frequency of 0.1 to 100 Hertz, typically 0.5 to 10 Hertz. The energy of each pulse will preferably range from 0.1 to 3.0 $J/cm^2$ in the wavelength range of 200 nm to 1 mm. Pulses will preferably be delivered to provide a dose of UV light (200 to 400 nm) of at least about 0.1 $mJ/cm^2$, preferably at least about 0.5 $mJ/cm^2$ so as to provide a triggered composition (in the form of a film or other article). It should be noted that although power supply 22 and capacitor 24 are preferred, other methods and equipment may be used to provide the desired pulses of energy to lamp 20.

When the oxygen scavenging composition is in the form of a film, the film may include a number of layers, with the oxidizable organic compound and optional transition metal catalyst layer preferably being arranged toward one side thereof. Multilayer oxygen scavenging films are described in U.S. Pat. No. 5,350,622, which is incorporated herein by reference in its entirety. It is preferable to expose only the oxidizable organic compound side of the multilayer film to pulses of light, although both sides can be exposed to the pulse light if desired. Further, it is preferred that any layers of the multilayer film that are between the source of pulses of light and the oxygen scavenging film be effectively transparent over the wavelength range from 200 to 400 nm. Thus, as illustrated in FIG. 1, film path 16 may be arranged so as to expose only one side of film to lamp 20.

Figure 2:
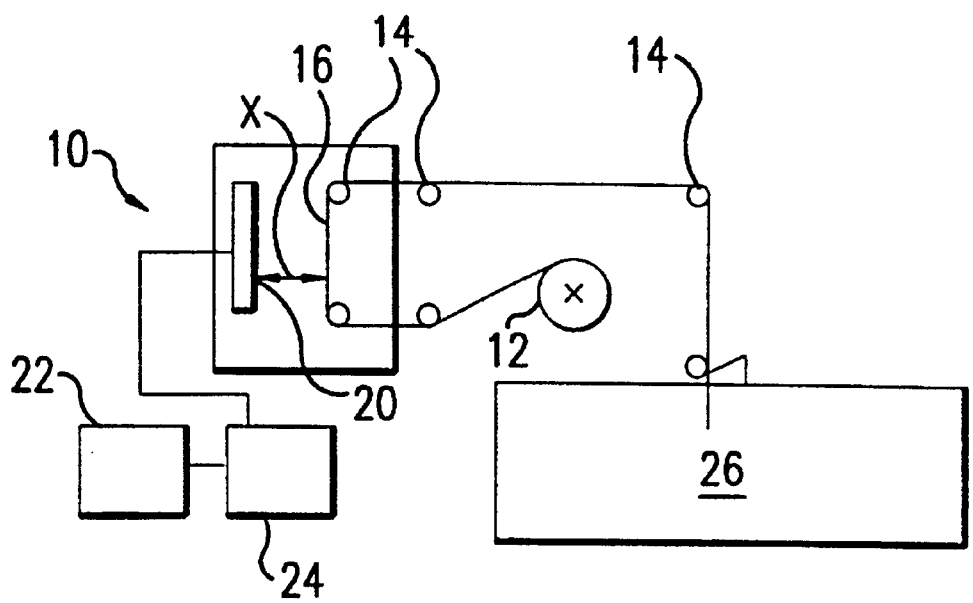
FIG. 2 schematically illustrates an apparatus and method incorporated in-line into a packaging system.

Referring now to FIG. 2, an embodiment of triggering unit 10 is illustrated wherein triggering unit 10 is incorporated in-line into a packaging apparatus employing film. Triggering unit 10 is positioned so as to receive film from unwind roll 12, pass film along film path 16 for exposure to pulses of UV light, and to feed triggered film directly to a packaging unit 26 schematically illustrated in the drawing. Triggered film is preferably immediately incorporated as a layer into packages so that the triggered film advantageously serves to reduce oxygen content within the package and/or serves to reduce oxygen ingress into said package.

The composition may be in a form other than film, such as, for example, rigid and semi-rigid articles including cartons, bottles, thermoformed trays and cups, gaskets, coatings, liners, adhesive and non-adhesive inserts such as packets as well as other articles all of which can be triggered by the method and apparatus of the invention.

Pulsed lamp systems such as those provided by Xenon Corp., Woburn, Mass. and those provided by Maxwell Laboratories, Inc. as described in U.S. Pat. No. 5,034,235, incorporated by reference in its entirety, are examples of lamp systems suitable for use in providing pulses of high intensity light in accordance with the invention. Such high intensity pulses of light serve to activate oxygen scavenging layers, components or portions of oxygen scavenging packaging materials with enhanced speed and efficiency, with reduced need for photoinitiators.

The invention may be further understood by reference to the following example.

EXAMPLE 1

Oxygen scavenging formulations were prepared in a Brabender mixing chamber at about 140° C. The formulations consisted of 40% Vector 8508-D (a styrene/butadiene copolymer from Dexco), about 60% EVA (ethylene/vinyl acetate copolymer with 9% vinyl acetate by weight of the copolymer, available from Exxon as LD318.92), 0.1% of the photoinitiator as indicated in Table 1 below, and 680 ppm of cobalt neodecanoate (Ten-Cem® from OMG Inc.).

Films were pressed to a thickness of 10–12 mils with a heated lab press. Portions of film (200 $cm^2$) were irradiated at a distance of 85 mm from the lamp housing for 7 seconds, with a pulsed xenon lamp (model RC-740, dual lamp, Xenon Corp.) The system was set to deliver about 10 pulses per second. The output of the lamp was also measured at a distance of 85 mm with an International Light model 730 radiometer equipped with either a SEE 240 detector, a 254 nm narrow band pass filter (NS254), and a neutral density filter (QNDS3), or a SEE 400 detector, a 320 nm wide band pass filter (WBS320), and a neutral density filter (QNDS3). Output of the lamp was about 6 $\mu W/cm^2$ at 254 nm, and was about 66 $mW/cm^2$ at 320 nm.

Irradiated films were then vacuum packaged in barrier bags (P 640b, Cryovac® division of W. R. Grace & Co.-Conn.), and inflated with 300 cc of atmosphere at about 1% residual oxygen. Samples were then stored at 4° C. (refrigerated) for the duration of the test. Portions of the headspace were periodically withdrawn and analyzed for oxygen with a Mocon LC 700F oxygen analyzer.

The resulting scavenging data is summarized below in Table 1. The average rate is calculated by considering only the end points, with the following formula: Average Rate =cc $O_2$ scavenged/($m^2$.day), and in these examples was calculated after 5 days. The peak instantaneous rate is the highest scavenging rate observed during any sampling period, and is given by: $\Delta$ cc $O_2$ scavenged/($m^2.\Delta$day), where $\Delta$ is the incremental change between two consecutive measurements. The number in parenthesis is the number of days after triggering required to reach the peak scavenging rate. Rates are further reported as the mean of three replicates along with the standard deviation ($\sigma$).

TABLE I

Pulsed Light Triggering with Various Photoinitiators

| Sample | Photoinitiator | Induction Period (days) | Average Rate (cc $O_2/m^2/d$) Mean | $\sigma$ | Ins. Rate (cc $O_2/m^2/d$) Mean | $\sigma$ |
|---|---|---|---|---|---|---|
| A | Benzophenone | <1 | 33.2 | 1.2 | 153 (1) | 5 |
| B | 4,4'-dimethoxy-benzophenone | <1 | 349 | 0.42 | 147 (1) | 2 |
| C | none (control) | >14 | 0 | — | 0 | — |
| D | 4,4'-dimethyl-benzophenone | <1 | 344 | 1.7 | 145 (1) | 10 |
| E | anatase $TiO_2$ | ≦1 | 30.9 | 4.6 | 53 (4) | 21 |

The data in Table 1 show that pulsed light is quite effective in triggering oxygen scavenging materials. Some differences in oxygen scavenging rate are noted with various photoinitiators. It is also noted that the use of a photoinitiator greatly shortens the induction period with this particular lamp configuration. All unirradiated samples also had induction periods well in excess of 14 days.

It is to be understood that the invention is not limited to the illustrations described and shown herein.

What is claimed is:
1. A method comprising:
   a) providing an unwind roll, said roll adapted to hold a roll of oxygen scavenging film, the film comprising an oxidizable organic compound;
   b) providing an apparatus for triggering said film, the apparatus comprising at least one lamp adapted to emit pulses of UV light having a wavelength of between 200 and 400 nanometers;

c) advancing the film from the unwind roll to the apparatus for triggering the film by means of a series of rollers that define a film path extending from the unwind roll to the apparatus for triggering the film;

d) passing the film past at least one said lamp;

e) exposing the film to pulses of UV light;

f) advancing the triggered film from the apparatus for triggering to an apparatus for packaging articles; and g) applying said triggered film, in the apparatus for packaging articles, to make packages for containing said articles;

whereby said triggered film is continuously triggered and incorporated into said packages so as to provide oxygen scavenging packages.

2. The method of claim 1 comprising exposing the film to pulses of UV light, each pulse having i) a duration of between 1 microsecond and 1 millisecond, ii) a frequency of between 0.1 and 100 Hertz, and iii) an intensity of at least 350 mW/cm$^2$.

3. The method of claim 1 comprising exposing the film to pulses of UV light to provide the film with a dose of UV light per pulse of at least 0.1 mJ/cm$^2$.

4. The method of claim 1 comprising exposing the film to a dose of UV light per pulse of at least 0.1 J/cm$^2$.

5. The method of claim 1 comprising exposing the film to a dose of UV light per pulse of between 0.1 J/cm$^2$ and 3.0 J/cm$^2$.

6. The method of claim 1 comprising storing energy in an energy storage capacitor, and releasing said energy to provide pulses of said light.

7. An apparatus comprising:

a) an unwind roll, said roll adapted to hold a roll of oxygen scavenging film, the film comprising an oxidizable organic compound;

b) an apparatus for triggering said film, the apparatus comprising at least one lamp adapted to emit pulses of UV light having a wavelength of between 200 and 400 nanometers;

c) a series of rollers that define a film path extending from the unwind roll to the apparatus for triggering the film;

d) an apparatus for packaging articles; and e) means for advancing triggered film from the apparatus for triggering to the apparatus for packaging articles.

8. The apparatus of claim 7 comprising an apparatus for triggering said film, the apparatus comprising at least one lamp adapted to emit pulses of UV light, each pulse having i) a duration of between 1 microsecond and 1 millisecond ii) a frequency of between 0.1 and 100 Hertz, and iii) an intensity of at least 360 mW/cm$^2$.

9. The apparatus of claim 7 comprising an apparatus for triggering said film, the apparatus comprising at least one inert gas lamp.

10. The apparatus of claim 7 comprising an apparatus for triggering said film, the apparatus comprising at least one lamp adapted to emit pulses of UV light to provide the film with a dose of UV light per pulse of at least 0.1 mJ/cm$^2$.

11. The apparatus of claim 7 comprising an apparatus for triggering said film, the apparatus comprising at least one lamp adapted to expose the film to a dose of UV light per pulse of at least 0.1 J/cm$^2$.

12. The apparatus of claim 7 comprising an apparatus for triggering said film, the apparatus comprising at least one lamp adapted to expose the film to a dose of UV light per pulse of between 0.1 J/cm$^2$ and 3.0 J/cm$^2$.

13. The apparatus of claim 7 comprising an energy storage capacitor, and a means of releasing energy to provide pulses of light.

* * * * *